(12) United States Patent
Whalley et al.

(10) Patent No.: US 10,089,237 B2
(45) Date of Patent: *Oct. 2, 2018

(54) DATA FILTER CACHE DESIGNS FOR ENHANCING ENERGY EFFICIENCY AND PERFORMANCE IN COMPUTING SYSTEMS

(71) Applicant: Florida State University Research Foundation, Inc., Tallahassee, FL (US)

(72) Inventors: David Whalley, Tallahassee, FL (US); Magnus Själander, Uppsala (CH); Alen Bardizbanyan, Gothenburg (CH); Per Larsson-Edefors, Gothenburg (CH)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,854

(22) Filed: Mar. 3, 2017

(65) Prior Publication Data

US 2017/0177490 A1 Jun. 22, 2017

Related U.S. Application Data

(63) Continuation of application No. 14/473,346, filed on Aug. 29, 2014, now Pat. No. 9,612,960, which is a
(Continued)

(51) Int. Cl.
*G06F 12/08* (2016.01)
*G06F 12/0891* (2016.01)
(Continued)

(52) U.S. Cl.
CPC ...... *G06F 12/0891* (2013.01); *G06F 12/0802* (2013.01); *G06F 12/0811* (2013.01);
(Continued)

(58) Field of Classification Search
CPC .. G06F 12/0802; G06F 12/0811; G06F 12/12; G06F 12/0864
(Continued)

(56) References Cited

U.S. PATENT DOCUMENTS

5,404,484 A 4/1995 Schlansker
5,765,184 A 6/1998 Durante
(Continued)

*Primary Examiner* — Than Vinh Nguyen
(74) *Attorney, Agent, or Firm* — Eversheds Sutherland (US) LLP (57) ABSTRACT

Certain embodiments herein relate to, among other things, designing data cache systems to enhance energy efficiency and performance of computing systems. A data filter cache herein may be designed to store a portion of data stored in a level one (L1) data cache. The data filter cache may reside between the L1 data cache and a register file in the primary compute unit. The data filter cache may therefore be accessed before the L1 data cache when a request for data is received and processed. Upon a data filter cache hit, access to the L1 data cache may be avoided. The smaller data filter cache may therefore be accessed earlier in the pipeline than the larger L1 data cache to promote improved energy utilization and performance. The data filter cache may also be accessed speculatively based on various conditions to increase the chances of having a data filter cache hit.

7 Claims, 6 Drawing Sheets

Related U.S. Application Data continuation-in-part of application No. 14/084,433, filed on Nov. 19, 2013, now Pat. No. 9,600,418.

(60) Provisional application No. 61/728,231, filed on Nov. 19, 2012.

(51) Int. Cl.
  *G06F 12/0811* (2016.01)
  *G06F 12/0802* (2016.01)
  *G06F 12/0864* (2016.01)
  *G06F 12/12* (2016.01)

(52) U.S. Cl.
  CPC ......... *G06F 12/0864* (2013.01); *G06F 12/12* (2013.01); *G06F 2212/1028* (2013.01); *G06F 2212/60* (2013.01); *G06F 2212/62* (2013.01); *Y02D 10/13* (2018.01)

(58) Field of Classification Search
  USPC ................................................ 711/118, 122
  See application file for complete search history.

(56) References Cited

U.S. PATENT DOCUMENTS

| | | |
|---|---|---|
| 5,987,561 A | 11/1999 | Witt |
| 9,612,960 B2* | 4/2017 | Whalley ............ G06F 12/0811 |
| 2002/0138700 A1 | 9/2002 | Holmberg |
| 2003/0033510 A1 | 2/2003 | Dice |
| 2003/0074530 A1 | 4/2003 | Mahalingaiah |
| 2006/0053258 A1* | 3/2006 | Liu .................... G06F 12/0811 |
| | | 711/145 |
| 2006/0143396 A1 | 6/2006 | Cabot |
| 2009/0055589 A1 | 2/2009 | Croxford et al. |
| 2009/0094418 A1 | 4/2009 | Warner et al. |
| 2009/0138658 A1 | 5/2009 | Dreslinski et al. |
| 2010/0023700 A1 | 1/2010 | Chen |
| 2010/0153646 A1* | 6/2010 | Chen .................. G06F 12/0897 |
| | | 711/122 |
| 2014/0068175 A1 | 3/2014 | Kaplan |
| 2014/0143498 A1* | 5/2014 | Olson ................ G06F 12/0802 |
| | | 711/132 |

* cited by examiner

DATA FILTER CACHE DESIGNS FOR ENHANCING ENERGY EFFICIENCY AND PERFORMANCE IN COMPUTING SYSTEMS

CROSS-REFERENCE TO RELATED APPLICATIONS

The present application is a continuation of U.S. application Ser. No. 14/473,346, filed on Aug. 29, 2014, and entitled "Data Filter Cache Designs for Enhancing Energy Efficiency and Performance in Computing Systems," which is a continuation-in-part of U.S. application Ser. No. 14/084,433, filed on Nov. 19, 2013, and entitled "Systems and Methods for Improving Processor Efficiency Through Caching," which claims priority to U.S. Provisional Application No. 61/728,231, filed on Nov. 19, 2012, and entitled "Systems and Methods for Improving Compiler Efficiency Through Caching," all three of which are hereby incorporated by reference in their entirety as if fully set forth herein.

BACKGROUND

Demand for computing systems, such as embedded and general-purpose computers, continues to increase as these computing systems are being used for an increased number of purposes. As a direct consequence, energy efficiency and performance of computing systems have become increasingly important. For example, mobile devices that rely on limited power supplies, such as batteries, may not sustain performance of complex, processor-intensive applications that may rapidly reduce the availability of such power supplies. As another example, processes performed by general-purpose computers may be constrained due to the amount of heat generated by their processors, which may also limit the number and/or type of processes that may be performed by general-purpose computers.

Existing techniques aimed at addressing energy efficiency and performance concerns have sought improvements in level one data cache (L1 DC) management. While these techniques utilize data filter caches (DFCs) in an effort to reduce energy usage, the manner in which data filter caches are used is deficient in a number of ways. For example, transferring an entire line of data between an L1 DC to a DFC in a single cycle may increase the area of the L1 DC and the energy required to access it, among other unintended consequences. Another deficiency may stem from the belief that data filter caches are impractical because they typically incur an execution time penalty for each filter cache miss. Such deficiencies have limited existing techniques that attempt to improve energy efficiency and performance of computing systems.

BRIEF DESCRIPTION OF THE FIGURES

Reference will now be made to the accompanying drawings, which are not necessarily drawn to scale, and wherein.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

BRIEF SUMMARY

Certain embodiments herein relate to data filter cache designs for enhancing energy efficiency and performance in computing systems. According to an example embodiment, there is disclosed a method. The method may include accessing, by at least one processor, at least one of a data filter cache or a level one (L1) data cache. The data filter cache may include one or more first lines that have a capacity that is less than a capacity of one or more second lines in the L1 data cache. The method may also include determining, by at least one processor based at least in part on the accessing, that data was missed in the data filter cache.

After determining that the data was missed in the data filter cache, the method may further include accessing, by the at least one processor, the data in the L1 data cache. The accessing may include comparing a first tag associated with the data missed from the data filter cache to one or more second tags associated with the one or more second lines in the L1 data cache. The accessing may further include determining that the first tag matches a second tag of the one or more second tags, and determining the data in the L1 data cache that corresponds to the first tag. The determined data from the L1 data cache may be stored in the data filter cache, in one embodiment.

According to another example embodiment, there is disclosed a device. That device may include a level one (L1) data cache, a data filter cache including a portion of data stored in the L1 data cache, and at least one processor that is configured to determine a memory address comprising a calculated tag and index, determine a base address tag and index associated with a data filter cache, and determine whether to perform speculative access of the data filter cache based at least in part on a base address and an offset associated with the memory address. When the determination is to perform speculative access, the at least one processor may be configured to access the data filter cache to obtain data. When the determination is not to perform speculative access, the at least one processor may be configured to access the L1 data cache to obtain the data.

According to another example embodiment, there is disclosed a system. The system may include at least one memory that includes computer-executable instructions and at least one processor configured to execute the computer-executable instructions to access at least one of a data filter cache or a level one (L1) data cache. The data filter cache may include one or more first lines that have a capacity that is less than a capacity of one or more second lines in the L1 data cache. The at least one processor may also be configured to determine that data was missed in the data filter cache.

After determining that the data was missed in the data filter cache, the at least one processor may be further configured to access the data in the L1 data cache. The accessing may include comparing a first tag associated with the data missed from the data filter cache to one or more second tags associated with the one or more second lines in the L1 data cache. The accessing may also include the at least one processor being further configured to determine that the first tag matches a second tag of the one or more second tags, and determine the data in the L1 data cache that corresponds to the first tag. The determined data from the L1 data cache may be stored in the data filter cache.

DETAILED DESCRIPTION

Certain embodiments herein relate to, among other things, designing data cache systems to enhance energy efficiency and performance of computing systems. A computer processor may receive instructions to perform any number of functions, at least some of which may involve accessing and/or storing data in memory registers. A data filter cache herein may be designed to store a portion of the data stored in other volatile memory storage locations, such as a level one (L1) data cache. Such a data filter cache may also reside between the L1 data cache and a register file in the primary compute unit. The data filter cache may therefore be accessed before the L1 data cache when a request for data is received and processed. Upon a data filter cache hit, or upon discovering the data in the data filter cache, access to the L1 data cache may be avoided. In this way, the smaller data filter cache may be accessed earlier than the larger L1 data cache to promote improved energy utilization and performance.

The data filter cache may be accessed speculatively to increase the chances of having a data filter cache hit early. Speculative access may mean that the data filter cache may or may not be accessed in lieu of the L1 data cache depending on certain conditions. For example, the data filter cache may be accessed instead of the L1 data cache if a tag and index of a base memory address matches a tag and index of a calculated memory address. As another example, the data filter cache may also be accessed if a carry out of a line offset associated with the calculated memory address does not exist. Other examples, considerations, or criteria may also exist in other examples.

Certain embodiments herein also relate to ensuring consistency between the data filter cache and the L1 data cache. In other words, data in the data filter cache may be kept current with the L1 data cache, and vice versa, upon writing or removing data from either cache, as non-limiting examples. For example, when a line of data is removed from the L1 data cache, the same line may also be removed from the data filter cache. Further, if a line of data is written to the data filter cache, then the same line may also be written to the L1 data cache. Such functionality may be referred to as a write-through policy herein.

Various other techniques described herein may relate to generating virtual tags for memory addresses, efficiently filling data cache lines, such as when a data cache line is being replaced, and enabling more efficient stores to the L1 data cache. Each of these features, in addition to the features briefly described above, are described in greater detail below.

Figure 1:
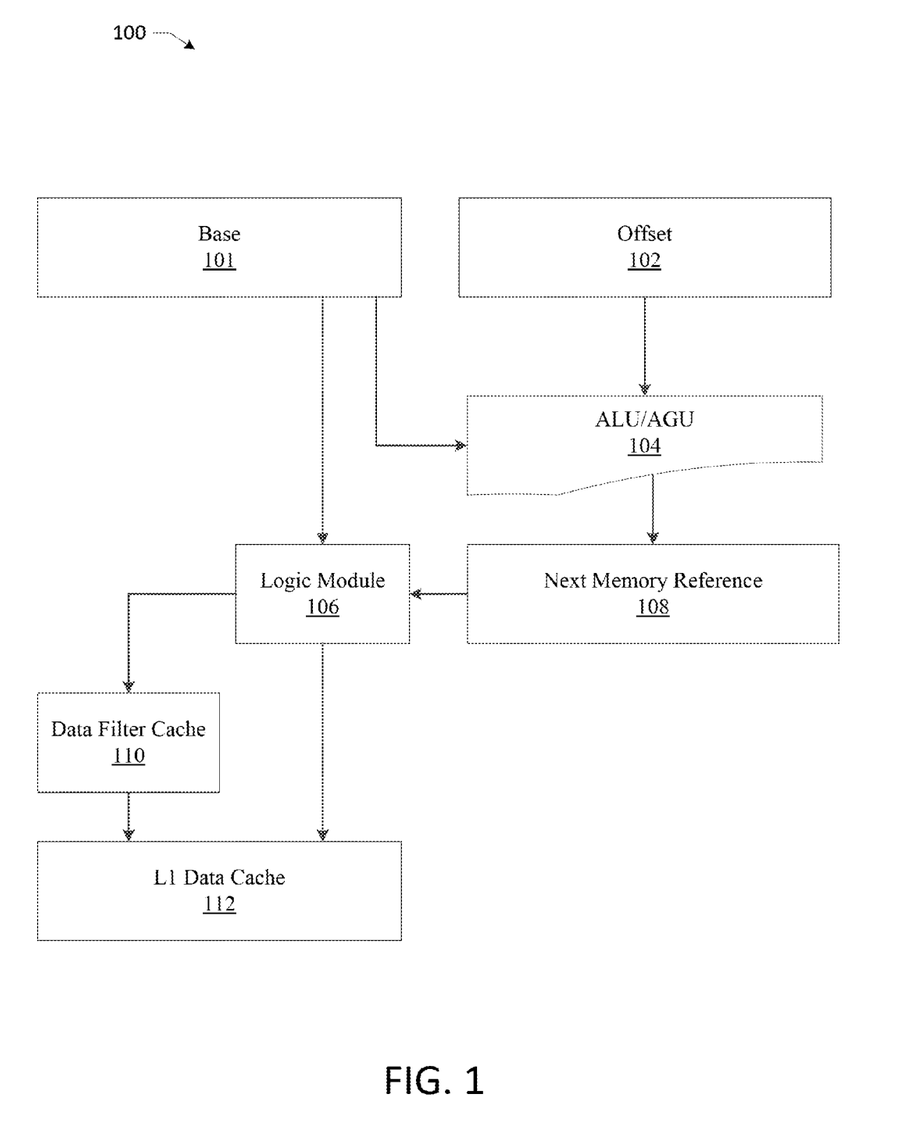
FIG. 1 illustrates a schematic block diagram of an illustrative system architecture that includes a filter cache according to an embodiment of the disclosure.

FIG. 1 depicts a schematic block diagram of an illustrative system architecture 100 that includes a filter cache in accordance with certain embodiments of the disclosure. The architecture 100 may include an integrated circuit, a System-on-a-Chip (SOC), a processor board, a processor die, or any other suitable architecture. The architecture 100 may include one or more registers (e.g., pipeline registers that may exist between various pipeline stages) that may store one or more memory references. Each memory reference may be identified by a base 101 and an offset 102. The base 101 may include registers that store memory address locations.

The architecture 100 may also include, but is not limited to, an arithmetic logic unit (ALU) or an address generation unit (AGU) 104, which may be an adder. The ALU/AGU 104 may calculate the next memory reference 108 from which data may be accessed. In so doing, the ALU/AGU 104 may receive the base 101 and the offset 102 and add them to determine the next memory reference 108. In one embodiment, the next memory reference 108 may include a line offset that indicates the byte offset within the line that is being accessed in the next memory reference 108. A tag and a line index may also be generated and associated with the determined next memory reference 108.

The architecture 100 may further include a logic module 106. The logic module 106 may receive certain inputs such as, but not limited to, a base 101, an offset 102, and a next index value. In one embodiment, the logic module 106 may determine whether the next memory reference 108 is to be accessed within the data filter cache 110 or the L1 data cache 112, and may generate an output signal that indicates such access. Such output signals may be represented by the arrows connecting the logic module 106 to the data filter cache 110 and the L1 data cache 112.

The determination of the next memory address may be based at least in part on the offset 102. For example, the data filter cache 110 may be accessed if the offset 102 is relatively small (e.g., within a predetermined range), while the L1 data cache 112 may be accessed if the offset 102 is not relatively small. A relatively small offset may be one that has a magnitude that requires half the bits in a line size. For example, if the line size is 32 bytes, then a relatively small offset may have a range of −16 to 15 (10000 to 01111 for 5-bit two's complement representation).

An arrow between the data filter cache 110 and the L1 data cache 112 may represent the L1 data cache 112 being accessed instead of the data filter cache 110 when, for example, there is a miss in the data filter cache 110. A miss in the data filter cache 110 may be described as occurring when data that is desired is not identified or found in the data filter cache 110. Put another way, a miss in the data filter cache 110 may mean that data (e.g., data required for implementing an instruction) is missing from the data filter cache 110.

In instances in which data is removed from the L1 data cache 112, a set index and way (e.g., in the presence of an associative L1 data cache) may be checked to determine if the corresponding data should be evicted from the data filter cache 110. If a match is found between the index and way data for the L1 data cache 112 and the data filter cache 110, then the data may also be evicted from the data filter cache 110 in such instances, as will be described in greater detail below. On a data filter cache miss, an additional cycle may be required to fetch the cache line from the L1 data cache into the data filter cache, while at the same time providing the requested data (or instruction) to the central processing unit (CPU). The set index and way may also be used when a dirty cache line is evicted from the data filter cache to directly write the line back to the L1 data cache without requiring a tag check.

The data filter cache 110 may store at least a portion of the data stored in the L1 data cache 112. In certain embodiments herein, the data filter cache 110 may be less than or equal to the L1 data cache 112 in size. In one embodiment, the data filter cache 110 may be a specialized data cache that may be smaller in size than the L1 data cache 112. For example, the data filter cache 110 may include a 128-byte cache that has eight (8) lines, each line including 16 bytes, whereas the L1 data cache 112 may include a 32768-byte cache that has 2048 lines, where each line also includes 16 bytes. In one configuration, the size of a line within the data filter cache 110 may be equivalent in size to a cache line in the L1 data cache 112. More generally, a data filter cache capacity may be any percentage size of the L1 data cache capacity (e.g., 50.0%, 25.0%, etc.). The above sizes are for purposes of illustration and are not meant to be limiting. The data filter cache 110 and the L1 data cache 112 may have any size in other examples. The relatively smaller size for the data filter cache 110 may also mean that memory arrays associated with the data filter cache 110 for storing tags and data may be smaller than that for the L1 data cache 112.

The data filter cache 110 may be any suitable cache such as, but not limited to, a fully associative cache, a direct mapped cache, or any intermediary form of cache such as an N-way set associative cache (e.g., two-way set associative cache).

The architecture 100 described above may be included in a computing system or device in some implementations. The descriptions, processes, examples, etc., described herein may be performed in association with receiving and executing instructions by one or more processors in the computing system. Such instructions may be received and executed in association with software applications or program code running on the computing system. Executing the software applications or program code may require loading and storing instructions by a processor, among other functions related to implementing or carrying out the instructions associated with the software applications or program code.

As used herein, the term "device" may refer to any computing component that includes one or more processors that can be configured to execute computer-readable, computer-implemented, or computer-executable instructions. Example devices can include client-type devices, output-type devices, wearable devices, personal computers, server computers, server farms, digital assistants, smart phones, personal digital assistants, digital tablets, smart cards, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate the processes described herein.

In some embodiments, a data filter cache may be implemented for each thread that exists. For example, a data filter cache per thread may be used for multithreaded processors that periodically switch between a set of threads. Energy efficiency may be achieved in such implementations by virtue of data filter caches having a relatively small footprint. Further, a data filter cache as described herein may be integrated into existing multiprocessor systems without requiring modification to existing cache coherency protocols.

The memory of a computing device may store program instructions that may be loadable and executable on an associated processor, as well as data generated during the execution of computer programs. The memory may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc.

One or more other peripheral components or devices may also be associated with the computing device. Such components or devices may include, but are not limited to, storage such as removable and non-removable storage (e.g., magnetic storage, optical storage, and/or tape storage); input/output (I/O) devices, such as a keyboard, a mouse, a pen, etc.; and communication connections that may enable the computing device to communicate over one or more networks (e.g., wireless or wired networks) or communicate directly with other devices.

Figure 2:
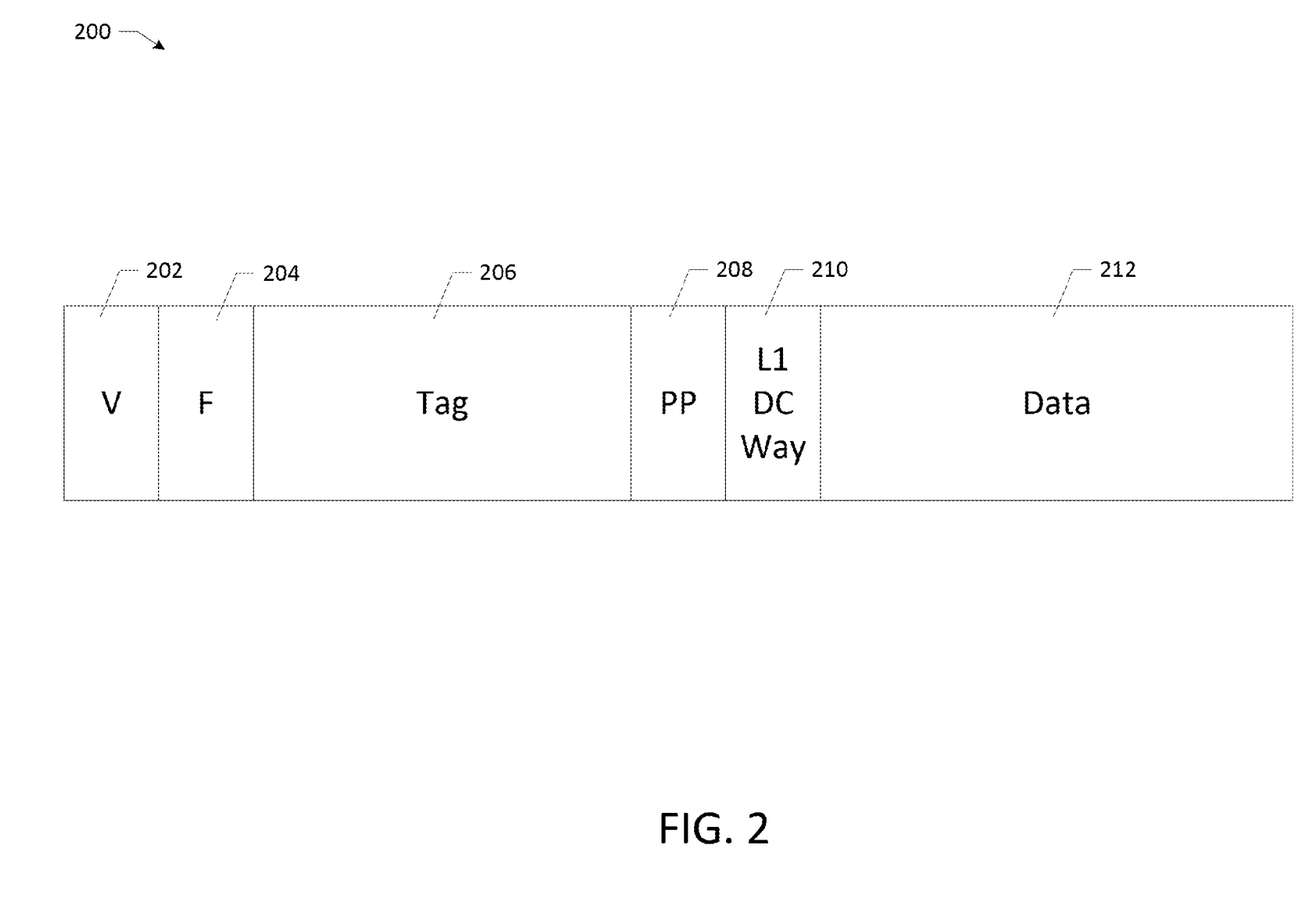
FIG. 2 illustrates the components of a data filter cache line according to an embodiment of the disclosure.

FIG. 2 depicts components of a data filter cache line 200 according to an embodiment of the disclosure. As shown, the data filter cache line 200 may include a valid bit (V) 202, a filled bit (F) 204, a tag 206, page protection bits (PP) 208, an L1 data cache (DC) way 210, and data 212.

The filled bit (F) 204 may indicate whether the data cache line has been filled. In one embodiment, a bit set to one (1) may indicate that the cache line has been filled, while a bit set to zero (0) may indicate that the cache line has not been filled. Each data filter cache line 200 may also include an L1 data cache way 210, as shown. The L1 data cache way 210 may indicate where in an L1 data cache that corresponding data in a data filter cache (e.g., the data 212) resides, in one configuration.

The valid bit (V) 202 may indicate that a match exists between the index and way of a data filter cache and an index and way of an L1 data cache. If a match is found, then the same line may be evicted from the data filter cache by clearing the valid bit (e.g., the V bit 202 in FIG. 2), in an example embodiment.

The PP bits 208 may be copied from the data translation lookaside buffer (DTLB) upon allocating the data filter cache line 200. The DTLB may perform, among other functions, a virtual-to-physical translation that may translate a virtual page number (VPN) to a physical page number (PPN) associated with an L1 data cache.

In certain embodiments herein, a data filter cache may be accessed using virtual addresses. Virtual tags may be stored in the data filter cache to facilitate such accesses, in one configuration. For example, an address associated with the tag 206 stored in the data cache line 200 may be virtual. All or at least a portion of the addresses associated with the tags 206 of the data filter cache line 200 may be virtual in certain embodiments herein.

Further, a data filter cache as described herein may include a write mask for each of the bytes in the data filter cache together with a single bit indicating if a line has been fetched from the L1 data cache. If only writes are performed to the L1 data cache line, then no fetch may be performed from the L1 data cache. If the access is to a location in the line that has not been written previously, the line may be fetched from the L1 data cache, and the write mask may be used to avoid writing over already written bytes in the cache line. If no read access is performed to a location that has not been written previously, the cache line may be written back to the L1 data cache without ever fetching the line from the L1 data cache.

The technical effects of using virtual tags for a data filter cache may include reduced access energy and the ability to access a data filter cache in parallel with memory address generation, such as that performed by the ALU/AGU 104 in FIG. 1. The technical effect of reduced access energy may occur as a result of not performing data translation lookaside buffer (DTLB) lookups, which may use relatively more access energy, for data filter cache accesses. The ability to access a data filter cache in parallel with memory address generation may result from removing the DTLB from the critical path when accessing the data filter cache, as implemented in certain embodiments herein.

In one embodiment, the least significant bits of the tag 206 may represent the index of the virtually tagged L1 data cache, and the conventional tag comparison logic may be used to detect matching indexes by ignoring the comparison of the most significant bits.

The L1 data cache way 210 may be stored with each data filter cache line, for example, when a new cache line is written to the data filter cache. In one embodiment, a new line may only be written to the data filter cache when a data filter cache miss has occurred. In such instances, access to the L1 data cache may be performed instead. Hit signals from an L1 data cache tag comparison may indicate in which L1 data cache way the data resides. As described, such L1 data cache way information may be stored in the data filter cache (e.g., as L1 data cache way 210). According to this configuration, an L1 data cache may be modified such that it may read hit signals, which may be the only modification required for the L1 data cache in one implementation.

Figure 3:
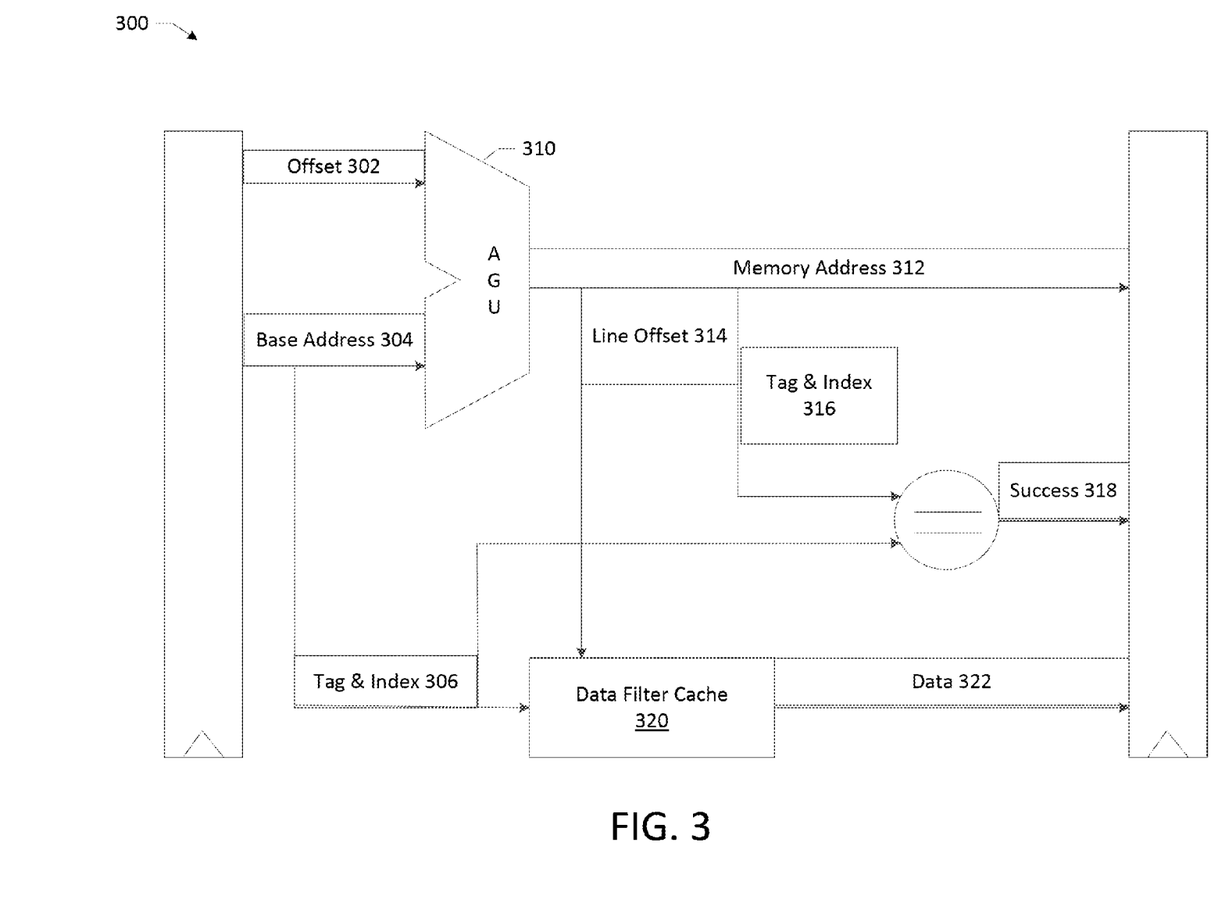
FIG. 3 is a schematic diagram that illustrates speculative access of a data filter cache, according to an embodiment of the disclosure.

FIG. 3 is a schematic diagram that illustrates speculative access of a data filter cache, according to an embodiment of the disclosure. Speculative access of the data filter cache may occur in the same pipeline stage that a memory address is generated, for example, by the address generation unit (e.g., the ALU/AGU 104 in FIG. 1), in one embodiment. In this way, the data filter cache may be accessed earlier in the pipeline (e.g., the processor pipeline) than the L1 data cache. In some embodiments, only the tag of the data filter cache may be accessed early, while both the tag and the data may be accessed early in other embodiments.

As shown in FIG. 3, speculative access of a data filter cache may be verified by comparing the base tag and index with the computed tag and index of the memory address that is generated in the same pipeline in which the data filter cache is speculatively accessed. An offset 302 and a base address 304 may be received by an AGU 310 and used to determine or calculate a memory address 312. The calculated memory address 312 may include the line offset 314, and the line index 316 and the tag 316 (which may be referred to as the tag and index 316 as shown). The line offset 314 may be used to identify the word, half-word, or byte to be accessed within a cache line. The line index 316 may be used to index into the tag 316 and data arrays, and the tag 316 may be used to verify whether the specified memory item resides in the cache.

As further shown in FIG. 3, a tag and index 306 of the base address 304 may be compared to the computed tag and index 316 of the calculated memory address 312. If there is a match between the tag and index 306 and the computed tag and index 316, then a success 318 may be determined to indicate that speculative access of the data filter cache has been verified. The data filter cache 320 may therefore utilize the tag and index 306 to access the data 322 earlier in the pipeline (e.g., before an L1 data cache is accessed).

In some embodiments, speculative access of a data filter cache may be verified by determining whether a carry out from the line offset exists (or whether a carry into the index occurred or a carry propagation happened after the line offset) instead of comparing the base tag and index 306 with the computed tag and index 316. If such a carry out does not exist, then speculative access of the data filter cache may be verified. The absence of a carry out may mean that the tag and index and the base address have not changed. As described above, a logic module (e.g., the logic module 106 in FIG. 1) may facilitate the determination of whether a speculative access of the data filter cache is successful. As mentioned, the data filter cache 320 may be accessed if the offset 302 is relatively small (e.g., within a predetermined range), while an L1 data cache may be accessed if the offset 302 is not relatively small.

In some examples, a speculative access may not be successful when the offset 302 is too large or when a carry out exists. If a successful speculative data filter cache access does not occur, then certain functions herein may be performed in response to access data. For example, the L1 data cache may be directly accessed in a stage following a determination that the speculative access of the data filter cache was unsuccessful (e.g., the next stage). Such an access may prevent or limit additional delays. As another example, the data filter cache may be accessed again in the following stage (e.g., after the speculative access of the data filter cache was determined to be unsuccessful). Such an access may provide energy benefits when there is a data filter cache hit and a one-cycle miss penalty when there is a data filter cache miss.

To avoid data filter cache miss cycles due to speculation failures, the data filter cache and the L1 data cache may both need to be accessed on the next cycle after the speculation fails, in one embodiment. If using a data filter cache writeback policy, the up-to-date data filter cache data should be used in the event of a data filter cache hit.

The technical effects of accessing the data filter cache early in the pipeline may include the elimination or reduction of a performance penalty. If there is a data filter cache miss, for example, then the data filter cache miss penalty may be avoided since the L1 data cache may still be accessed in the pipeline stage after performing the address calculation generation if a write-through policy is utilized between the data filter cache and the L1 data cache. If there is a data filter cache hit, then load hazards associated with the L1 data cache hits may be avoided, thereby improving performance. Further, accessing both the tags and data of a data filter cache earlier in the pipeline (e.g., before the L1 data cache is accessed) may avoid a performance penalty and improve the execution time of the processor.

In certain embodiments herein, a fast address technique may be implemented to eliminate performance penalties associated with a data filter cache. A fast address calculation may include a delay of a single OR-gate and, thus, may be performed in the same clock cycle as the filter cache access, in one embodiment. This may enable data accesses to be serviced in the first address calculation stage of a conventional two-cycle load/store pipeline. On a data filter cache miss, the L1 data cache may be accessed as normal in the second stage, thereby eliminating any performance penalties associated with conventional filter caches. The fast address calculation technique may make it possible to quickly calculate the index and tag with only a single OR-gate delay. In one embodiment, the index and the tag may be used to access a filter cache directly in the execute stage of the pipeline. At the end of the execute stage, the index and the tag may be verified, for example, by detecting that no carry into the index portion of the address was created during the conventional address calculation performed by the ALU (e.g., the ALU/AGU 104 in FIG. 1).

In one embodiment, a fast address calculation may include computing the least significant bits (e.g., the 10 least significant bits) using a conventional adder while speculatively using the most significant bits of the base address. A data filter cache as described herein may combine a filter cache with the speculative address calculation, as described above. The data filter cache may be accessed speculatively while the L1 data cache may be accessed on a subsequent cycle only on a miss-speculation, in one embodiment. In certain embodiments herein, a speculative address calculation may be performed within the time of a normal address calculation because the speculative address calculation may only perform a partial address calculation, which may be faster than a full address calculation, and the access time of the data filter cache may be faster than that for the larger L1 data cache. Therefore, there may not be a performance penalty on a miss-speculation because the L1 data cache may be directly accessed after the complete address calculation, which may be required to access the L1 data cache.

The above descriptions in FIG. 3 are for purposes of illustration and are not meant to be limiting. Other descriptions, configurations, examples, etc., may exist. For example, speculative access of a data filter cache may be performed for load and/or store operations. Speculative access may also be performed when the value of an offset, such as the offset 102 in FIG. 1, does not exceed the value represented in the line offset of the address.

Figure 4:
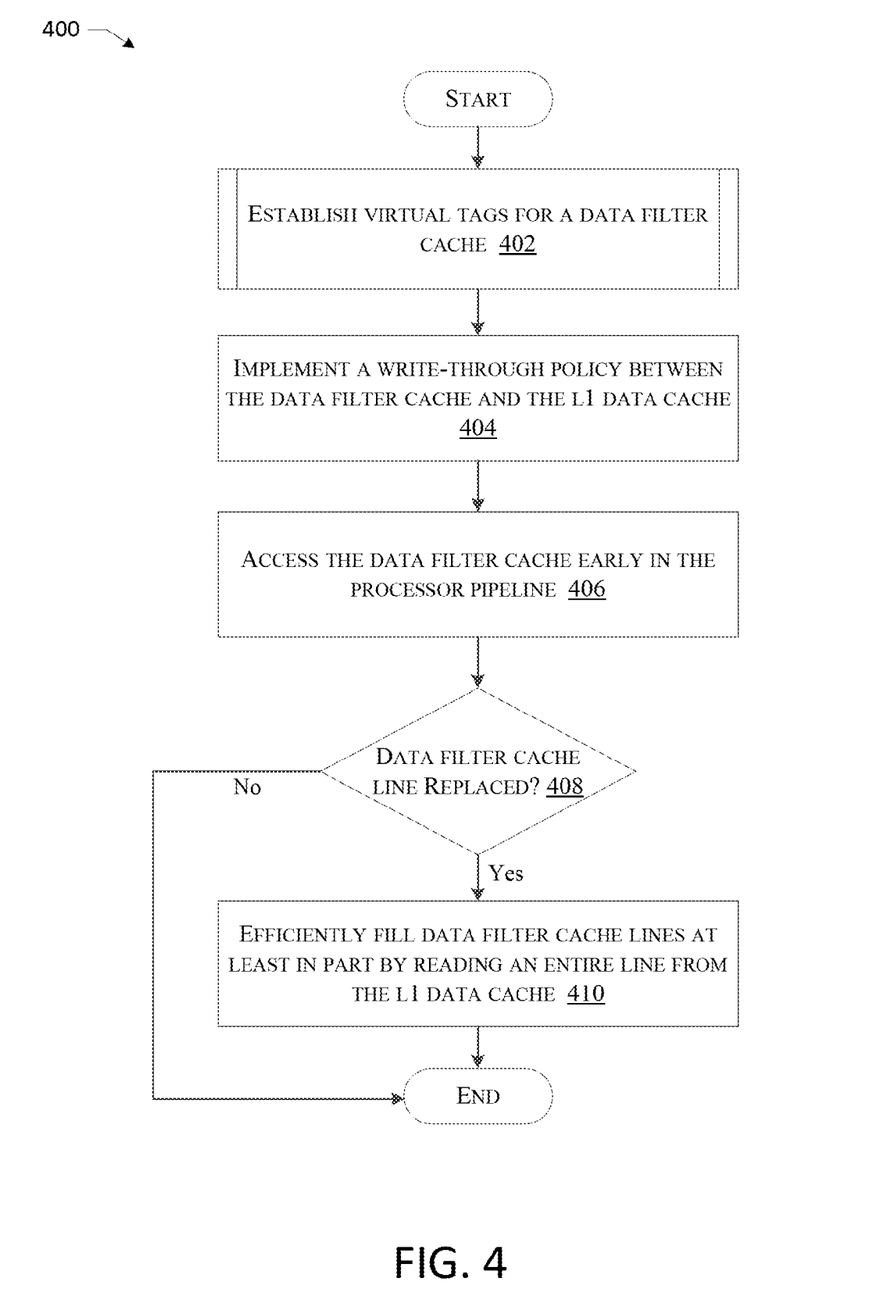
FIG. 4 illustrates a flow diagram of an example process for enhancing energy efficiency and performance of computing systems using data filter cache designs described herein, according to an embodiment of the disclosure.

FIG. 4 depicts a flow diagram of an example process 400 for enhancing energy efficiency and performance of computing systems using data filter cache designs described herein, according to an embodiment of the disclosure. The example process may be implemented by a computing device, which may include one or more processors, memory, and other components as described above. The example process 400, although shown in a particular order, may be performed in any order or may be performed independent of one another in various implementations. Further, at least some of the processes may not be performed in some implementations. Additional processes may be performed in yet other implementations.

The example process 400 may begin at block 402, where virtual tags for a data filter cache may be established. As described above, establishing virtual tags for the data filter cache may reduce data access energy since DTLB lookups may not be required for data filter cache accesses, and the DTLB may be removed from the critical path when accessing the data filter cache. Problems associated with virtual tags may be handled as described in FIGS. 5A and 5B.

A write-through policy associated with the data filter cache and the L1 data cache may be implemented at block 404. Utilizing a write-through policy may require writes to both the data filter cache and the L1 data cache upon executing a store instruction. In this way, all lines in the data filter cache may also be resident in the L1 data cache. Put another way, a write-through policy may ensure that data in the data filter cache is kept consistent with data in the L1 data cache. A write-through policy may also ensure that the L1 data cache includes (e.g., strictly includes) the cache lines in the data filter cache.

For each data filter cache line, information indicating the L1 data cache way where the data filter cache line resides may be stored. Storing such information may facilitate identifying data filter cache lines in an L1 data cache. For example, after an L1 data cache miss or receiving a cache coherency request, a cache line may be evicted from the L1 data cache. After a cache line is evicted from the L1 data cache, the way and index of an evicted line may be compared to those stored in the data filter cache. If a match is found, then the same line may be evicted from the data filter cache by clearing the valid bit (e.g., the V bit 202 in FIG. 2), in an example embodiment. In this way, the contents of the data filter cache and the L1 data cache may be kept consistent.

On data filter cache store hits, performance of an L1 data filter tag check or accesses to a DTLB may not be performed since the L1 data cache may be virtually indexed. Only the write operation to the data memory may be performed on the L1 data cache in such instances. Further, a store to an L1 data cache may be accomplished in one less cycle when the store is a data filter cache hit, since an L1 data filter cache tag check may not be performed. Performing an L1 data cache store in one cycle may eliminate a structural hazard when an L1 data cache load comes after (e.g., immediately follows) the store. In this way, the overhead associated with using a write-through policy may be reduced.

By virtue of implementing a write-through policy as described herein, an L1 data cache may be used instead of a data filter cache if, for example, the data filter cache cannot be accessed. Utilization of a write-through policy may require an L1 data cache to be accessed for every store instruction, in some implementations. Such a requirement may not limit the performance of data filter cache designs herein at least for the reason that store instructions are relatively less frequent than load instructions, and therefore by optimizing load instructions, the energy efficiency and performance improvements described herein may be realized. Further energy efficiency and performance improvements may be realized by using a data filter cache to perform the majority of the writes to an L1 data cache, as implemented in certain embodiments herein.

In various embodiments herein, a data filter cache described herein may utilize a write-allocate policy or a no-write-allocate policy in conjunction with a write-through policy. As used herein, a write-allocate policy may refer to allocating and fetching a line on a store miss. A no-write-allocate policy may refer to not allocating a line in the cache on a store miss and storing information to the next level in the memory hierarchy. Using a write-allocate policy in conjunction with a write-through policy may increase the ratio of data filter cache store hits, which may reduce the L1 data cache store energy.

At block 406, the data filter cache may be accessed early in the processor pipeline. As described above, accessing the data filter cache earlier in the pipeline may mean that the data filter cache may be accessed instead of, or before, the L1 data filter cache according to various example embodiments.

If a data filter cache line is replaced in an example embodiment at block 408, then lines in a data filter cache may be efficiently filled at least in part by reading an entire line (or at least a portion of the line) from the L1 data cache at block 410. A critical-word-first fill strategy may be used in some implementations. Such a strategy may begin with the first word that causes a miss in the data filter cache. The word that was missed may be first accessed or fetched from the L1 data cache, and the fetched word may be forwarded to the pipeline and written to the data filter cache. During such a line fill operation, the data filter cache read port (e.g., which may be included in a data filter cache configuration based on standard cells, which may have at least one read port and at least one write port since latches or flip-flops may be used) may not be occupied, thereby allowing load operations that hit in the data filter cache to still be serviced.

One or more bits may be associated with a line fill operation as described herein. The bits may indicate which words in the data filter cache have been filled. Such indications may be beneficial in instances in which a line to be filled is referenced by a load instruction before the fill operation is complete. As an example, subsequent load operations that miss in the data filter cache during the line fill operation may be diverted to the L1 data cache, and data filter cache allocation may not be permitted because a data filter cache line fill operation may already be in process, among other reasons. As another example, the line fill operation may be halted for the duration of the line fill cycle such that the current load operation may be serviced, for example, in instances in which a load is diverted to the L1 data cache.

Efficient filling of a data filter cache as described above may utilize a write-through policy, which may ensure that the L1 data cache includes the most recent data and avoids the execution time penalty associated with writing back a dirty line over multiple cycles.

The above descriptions in FIG. 4 are for purposes of illustration and are not meant to be limiting. Other descriptions, examples, configurations, etc., may also exist. For example, efficiently filling a data filter cache line may be performed in instances other than those in which data filter cache lines are replaced at block 408.

Figure 5A:
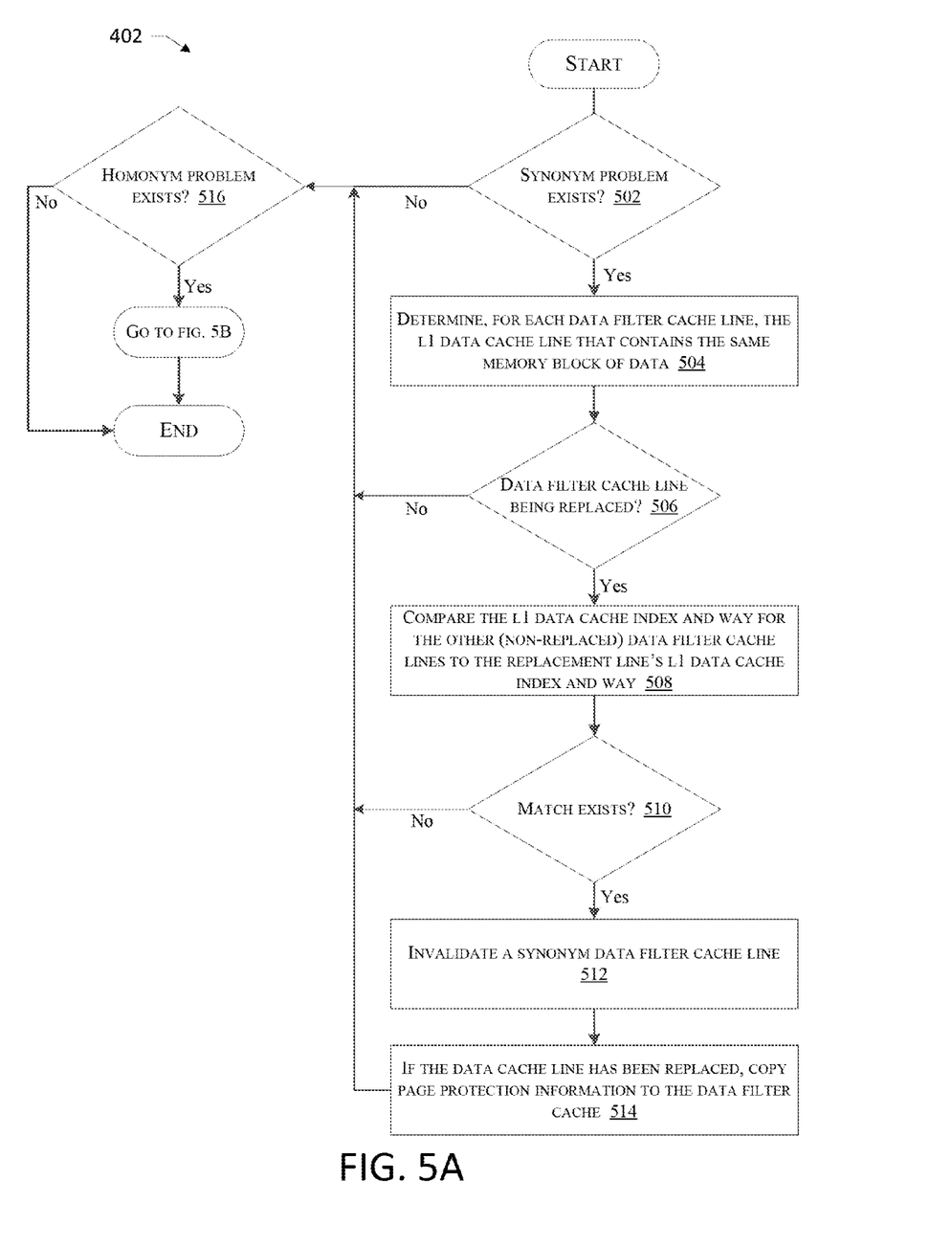
FIGS. 5A and 5B illustrate flow diagrams of example processes for handling issues that may result from establishing virtual tags for data filter caches, according to embodiments of the disclosure.
Figure 5B:
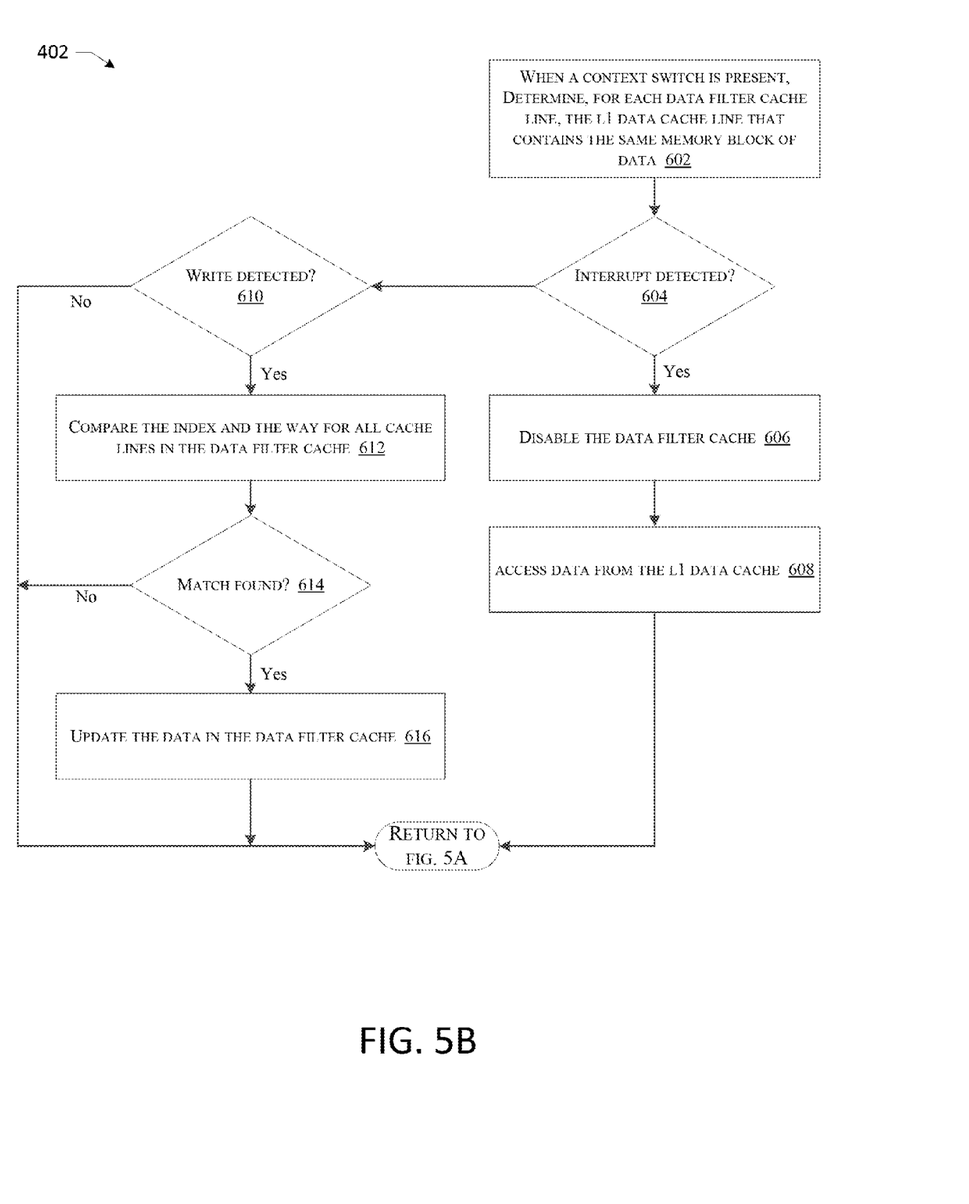

FIGS. 5A and 5B depict flow diagrams of example processes 402 for handling issues that may result from establishing virtual tags for data filter caches, according to embodiments of the disclosure. For example, FIG. 5A is directed to handling a synonym problem, and FIG. 5B is directed to handling a homonym problem.

In FIG. 5A, a determination may be made whether multiple virtual addresses map to the same physical address at block 502. Such mappings may be referred to herein as synonyms and may hinder processing stores since a processor may become confused by different values associated with the same location. Problems presented by synonyms may be handled by a fully associative data filter cache design, in one embodiment.

For each data filter cache line, the L1 data cache line that includes the same memory block of data as that found in the data filter cache line may be determined at block 504. To facilitate such a determination, the L1 data cache way (e.g., the L1 DC way 210 shown in FIG. 2) associated with each data filter cache line may be stored or otherwise retained. In some embodiments, the L1 data cache index may not be stored since it may be equivalent to the least significant bits (LSBs) of the data filter cache tag by virtue of the L1 data cache being virtually indexed and physically tagged (VIPT). As described above, a VIPT configuration may be established by a data translation lookaside buffer (DTLB), which may translate all or at least a portion of the tag to a physical address space. For example, the DTLB may translate a virtual page number (VPN) to a physical page number (PPN).

In certain embodiments herein, all lines in a data filter cache may also reside in the L1 data cache to facilitate the processes described herein. When a data filter cache line is being replaced (at block 506), therefore, the L1 data cache index and way for the other (e.g., non-replaced) data filter cache lines may be compared to the replaced line's L1 data cache index and way at block 508. If a match exists at block 510, then a synonym data filter cache line may be invalidated or evicted if it exists at block 512. In some embodiments, such a comparison may only be performed on data filter cache line replacements. The relatively small number of data filter cache lines may require relatively less access energy when performing the comparison.

If a data filter cache line has been replaced, then page protection information may be copied to the data filter cache at block 514. If a data filter cache line is not being replaced (as determined at either of blocks 506 or 514), then processing may end. Also, processing may end if a match does not exist (as determined at block 510) based on the comparison performed at block 508.

In one embodiment, a check to determine whether a homonym problem exists may be performed at block 516. A homonym problem may exist when a virtual address maps to multiple physical locations in different virtual address spaces. If a homonym problem exists, then processing may continue at FIG. 5B. If a homonym problem does not exist, processing may end.

Referring to FIG. 5B, when a context switch is performed at block 602, all or at least a portion of the cache lines in a data filter cache may be evicted or invalidated. Such invalidation may be possible by virtue of using a write-through policy implemented for data filter caches that may ensure that an L1 data cache is consistent with a data filter cache (e.g., contains the same data) and includes the most recent data, as described above. In this way, the L1 data cache line that includes the same memory block of data as a data filter cache line may be determined at block 602. The invalidation may occur in a single cycle, in one embodiment. The energy required to invalidate cache lines may be minimal since a data filter cache as described herein may be relatively small, and context switches may be relatively infrequent.

If an interrupt (e.g., a software or hardware interrupt) is detected at block 604, then the data filter cache may be disabled at block 606. In such instances, all data accesses may be serviced from the L1 data cache at block 608. The data filter cache may be kept current with writes (e.g., via a write-through policy) while disabled.

If a write is detected at block 610, then the index and way for all data filter cache lines may be checked (e.g., compared) at block 612. If a match is found at block 614, then data in the data filter cache (e.g., the data 212 in FIG. 2) may be updated at block 616. Page protection information from a DTLB may be copied to the data filter cache when a data filter cache line is replaced. Overhead associated with storing page protection information may be relatively low given the relatively small number of data filter cache lines. If a write is not detected at block 610, or a match is not found at block 614, then processing may return to FIG. 5A as shown.

In certain embodiments herein, the data filter cache may be inclusive with respect to the L1 data cache. Put another way, the data filter cache may closely mirror or include the same or approximately the same contents as the L1 data cache. As an example, the index and way of a cache line may be checked against those stored in the data filter cache, and if a match is found, then the cache line in the data filter cache may also be evicted. Such processes may be performed in response to the L1 data cache line being evicted as a result of a line replacement on a cache miss or as a result of a cache coherency request. Existing cache coherency protocols may not require modification, which enables the data filter cache to be compatible with various multiprocessor configurations.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
    determining that a plurality of virtual addresses map to a same physical address for accessing a data filter cache, the plurality of virtual addresses associated with one or more virtual tags;
    accessing the data filter cache and a level one (L1) data cache, the data filter cache comprising one or more first lines, the one or more first lines having a capacity that is less than a capacity of one or more second lines in the L1 data cache;
    determining, based at least in part on the accessing, that data was missed in the data filter cache;
    after determining that the data was missed in the data filter cache, accessing the data in the L1 data cache, wherein the accessing comprises:
        comparing a first physical tag associated with the data missed from the data filter cache to one or more second physical tags associated with the one or more second lines in the L1 data cache, wherein the first physical tag is further associated with a first virtual address, wherein the one or more second physical tags are further associated with one or more second virtual addresses;
        determining that the first physical tag matches a second physical tag of the one or more second physical tags;
        determining the data in the L1 data cache that corresponds to the first physical tag; and
        storing the data from the L1 data cache in the data filter cache.

2. The non-transitory computer-readable medium of claim 1, wherein the storing further comprises writing a new line to the data filter cache, the new line comprising the data from the L1 data cache, wherein the writing replaces at least one line of the one or more first lines in the data filter cache.

3. The non-transitory computer-readable medium of claim 1, wherein the data comprises first data, and wherein the operations further comprise:
    receiving a store instruction to store second data in the data filter cache; and
    writing the one or more first lines associated with the data filter cache to the L1 data cache.

4. The non-transitory computer-readable medium of claim 1, wherein the data comprises first data, and wherein the operations further comprise:
    determining that second data was missed in the L1 data cache;
    removing a line of the one or more second lines from the L1 data cache;
    comparing a first index and way associated with the line removed from the L1 data cache to one or more respective second indexes and ways associated with the one or more second lines in the data filter cache that remain after the removal;

determining that the first index and way matches a second index and way of the one or more second indexes and ways; and removing third data from the data filter cache that corresponds to the first index and way associated with the line removed from the L1 data cache.

5. The non-transitory computer-readable medium of claim 1, wherein the processor comprises a multi-threaded processor that generates a plurality of threads, and wherein the operations further comprise:

associating a plurality of respective data filter caches with the plurality of threads.

6. The non-transitory computer-readable medium of claim 1, wherein the computer-executable instructions cause the processor to further perform operations comprising:

determining that a line of the one or more first lines in the data filter cache is being replaced;

determining an index and way of the one or more second indexes and ways of the L1 data cache that comprises the same data as the line that is being replaced in the data filter cache;

comparing the index and way to indexes and ways associated with a portion of the one or more first lines in the data filter cache that are not being replaced;

determining that a match exists between the determined index and way and an index and way of the portion of the one or more first lines in the data filter cache; and after determining that a match exists, invalidating a synonym data filter cache line.

7. The non-transitory computer-readable medium of claim 1, wherein the data filter cache further comprises:

a valid bit comprising an indication whether the first index and way matches an index and way of the one or more second indexes and ways; and a filled bit comprising an indication whether a respective line of the one or more first lines has been filled with data.

* * * * *

UNITED STATES PATENT AND TRADEMARK OFFICE
CERTIFICATE OF CORRECTION

| | |
|---|---|
| PATENT NO. | : 10,089,237 B2 |
| APPLICATION NO. | : 15/449854 |
| DATED | : October 2, 2018 |
| INVENTOR(S) | : Whalley et al. |

Page 1 of 1

It is certified that error appears in the above-identified patent and that said Letters Patent is hereby corrected as shown below:

On the Title Page

In item (72), In "Inventors", in Column 1, Line 2, delete "CH" and insert --SE--;

In item (72), In "Inventors", in Column 1, Line 3, delete "CH" and insert --SE--;

In item (72), In "Inventors", in Column 1, Line 4, delete "CH" and insert --SE--.

Signed and Sealed this
Eighth Day of January, 2019

Andrei Iancu
*Director of the United States Patent and Trademark Office*